United States Patent
Kempfle et al.

[11] Patent Number: 6,059,223
[45] Date of Patent: May 9, 2000

[54] SAFETY BELT ATTACHMENT ARRANGEMENT

[75] Inventors: Thomas Kempfle, Bibertal; Andreas Wengert, Mutlangen; Georg Bannert, Ummendorf; Robert Fleischmann, Ulm; Robert Kopetzky, Lonsee, all of Germany

[73] Assignee: Takata (Europe) Vehicle Safety Technology GmbH, Ulm, Germany

[21] Appl. No.: 09/126,414

[22] Filed: Jul. 30, 1998

[30] Foreign Application Priority Data

Aug. 1, 1997 [DE] Germany .............................. 197 33 343

[51] Int. Cl.$^7$ .................................................... B65H 19/28
[52] U.S. Cl. ............................................................. 242/587.1
[58] Field of Search ................................ 242/587.1, 125.1

[56] References Cited

U.S. PATENT DOCUMENTS

| | | |
|---|---|---|
| 3,291,416 | 12/1966 | Gionta . |
| 3,304,021 | 2/1967 | Quenot .............................. 242/587.1 X |
| 3,325,212 | 6/1967 | Dillender ................................. 297/388 |
| 3,802,638 | 4/1974 | Dragan .............................. 242/587.1 X |
| 3,802,641 | 4/1974 | Saito ................................. 242/587.1 X |
| 3,857,528 | 12/1974 | Fiala ....................................... 242/107.4 |
| 3,942,740 | 3/1976 | Torphammar et al. ........... 242/107.4 B |
| 3,955,774 | 5/1976 | Weman ............................. 242/107.4 A |
| 4,008,863 | 2/1977 | Fohl ................................. 242/107.4 B |
| 4,061,291 | 12/1977 | Cunningham ............................ 242/107 |
| 4,079,964 | 3/1978 | Yamada et al. .......................... 280/747 |
| 4,119,281 | 10/1978 | Paitula et al. ............................ 242/107 |
| 4,256,273 | 3/1981 | Burleigh ............................ 242/587.1 X |
| 4,385,736 | 5/1983 | Yamamoto et al. ..................... 242/107 |
| 4,562,977 | 1/1986 | Hollowell ......................... 242/107.4 D |
| 5,176,335 | 1/1993 | Honl et al. ........................ 242/107.4 A |
| 5,312,066 | 5/1994 | Haston et al. .................... 242/107.4 B |
| 5,340,046 | 8/1994 | Schroth et al. .......................... 242/407 |
| 5,344,095 | 9/1994 | Frei ......................................... 242/374 |
| 5,358,275 | 10/1994 | Fohl ........................................ 280/806 |

FOREIGN PATENT DOCUMENTS

| | | |
|---|---|---|
| 0 093 043 | 11/1983 | European Pat. Off. . |
| 0 297 537 | 1/1989 | European Pat. Off. . |
| 0 252 834 | 6/1990 | European Pat. Off. . |
| 0 402 489 | 12/1990 | European Pat. Off. . |
| 0 557 863 | 9/1993 | European Pat. Off. . |
| 0 557 864 | 9/1993 | European Pat. Off. . |
| 0 442 014 | 4/1994 | European Pat. Off. . |
| 0 442 410 | 5/1994 | European Pat. Off. . |
| 0 620 141 | 10/1994 | European Pat. Off. . |
| 0 709 266 | 10/1994 | European Pat. Off. . |
| 0 562 423 | 1/1995 | European Pat. Off. . |
| 0 557 865 | 4/1995 | European Pat. Off. . |
| 2401671 | 3/1979 | France ................................ 242/587.1 |
| 2 331 942 | 6/1997 | France . |
| 28 02 031 | 7/1979 | Germany . |
| 30 09 894 | 9/1980 | Germany . |
| 34 07 379 | 4/1990 | Germany . |
| 40 18 795 | 12/1990 | Germany . |
| 40 06 117 | 1/1994 | Germany . |
| 42 11 374 | 12/1994 | Germany . |
| 43 24 967 | 1/1995 | Germany . |
| 43 31 027 | 3/1995 | Germany . |
| 295 05 268 U | 9/1995 | Germany . |
| 296 05 115 U | 8/1996 | Germany . |
| 296 13 044 U | 12/1996 | Germany . |
| 297 03 665 U | 4/1997 | Germany . |
| 2 151 458 | 7/1985 | United Kingdom . |
| 2 167 647 | 6/1986 | United Kingdom . |
| 2 174 590 | 11/1986 | United Kingdom . |

*Primary Examiner*—Donald P. Walsh
*Assistant Examiner*—William A. Rivera
*Attorney, Agent, or Firm*—Foley & Lardner

[57] ABSTRACT

An arrangement for the attachment of a belt to a reel of a safety belt reeling mechanism has a shaft (10') and a reel (12') arranged coaxial to the shaft with a belt (14') attached to the reel (12') forming a closed loop (16') at its end. A securing pin (18') extending transverse to the direction of the belt is provided in the loop and is not formed by the shaft (10').

8 Claims, 1 Drawing Sheet

SAFETY BELT ATTACHMENT ARRANGEMENT

BACKGROUND OF THE INVENTION

1. Field of the Invention

The present invention relates to an arrangement for attaching a belt to a reel of a safety belt reeling mechanism, including a shaft, a reel arranged coaxially to the shaft and a belt attached to the reel and forming a closed loop at its end.

2. Description of Related Art

One such belt attachment is disclosed in U.S. Pat. No. 4,385,736. In this arrangement, the loop of the belt is pushed over the shaft and a clamping member is mounted on this arrangement which presses the loop against the shaft. The belt passes to the outside through a slot in the clamping member and through a slot in the reel and is wound onto the reel.

A further belt attachment is disclosed in U.S. Pat. No. 4,119,281. In this belt attachment no separate shaft is provided. Clamping elements which firmly clamp the belt relative to the reel again serve for the attachment of the belt to the reel.

Finally, a belt attachment is known from the European patent 0 620 141 B1 in which the belt is held against the reel by surface pressure.

SUMMARY OF THE INVENTION

It is an object of the invention to provide a belt attachment of the initially named kind which reliably holds the belt, which can be manufactured at favorable cost and which enables simple installation.

This object is satisfied by the features of claim 1, and in particular by the fact that a securing pin standing transverse to the direction of the belt is provided in the loop but is not, however, formed by the shaft. When compared with the designs known from the prior art, an additional securing pin is provided in accordance with the invention which alone, or together with the shaft, prevents an undesired pulling off of the belt, and also an undesired empty rotation of the belt relative to the reel. The arrangement of the invention can be manufactured at favorable cost because the securing pin can be manufactured as a geometrically simple component. At the same time, a cost favorable installation is possible because no pressing procedures or the like have to be effected for the attachment of the belt.

Advantageous embodiments of the invention are described in the description, in the subordinate claims and in the drawings.

In accordance with a first advantageous embodiment, the belt can be wound around the shaft outside of the loop and partly almost fully surrounding the latter. In this way, the shaft is also used as a securing element, but with the securing pin located in the loop being provided as an additional securing element. In this embodiment a high degree of security is thus achieved in a simple manner.

In accordance with a further embodiment of the invention an axial cut-out in which the securing pin is received can be formed in the reel. This cut-out is preferably open in the radial direction and tapers towards the outer periphery of the reel, whereby emergence of the securing pin located in the loop is prevented. In this embodiment the securing pin, around which the loop is wound, is reliably and non-losably received in the cut-out, so that the belt can be wound onto the reel without interference.

In accordance with one embodiment of the invention the securing pin can be formed as a separate component which enables the pin to be pushed into the loop from the outside during installation. In accordance with an alternative embodiment, the securing pin is connected to the reel in one piece, whereby a further installation step can be omitted. In this case it is advantageous when the securing pin is formed by two spaced apart slots in the reel because the loop can then be pushed from the side onto the securing pin, so that the belt runs through the two slots in the region of the reel.

In accordance with a further preferred embodiment the securing pin provided in accordance with the invention and the shaft are located within the loop. Here, two securing elements are provided for double security in order to attach the belt to the reel.

The belt and/or the loop of the belt is/are preferably arranged with clearance between the shaft and the reel. An embodiment of this kind enables easy installation because the belt or the loop can be introduced between the shaft and the reel without canting arising and without pressing procedures or the like being necessary.

BRIEF DESCRIPTION OF THE DRAWINGS

In the following, the present invention is described purely by way of example with reference to advantageous embodiments and to the accompanying drawings in which are shown.

DETAILED DESCRIPTION OF PREFERRED EMBODIMENTS

Figure 1:
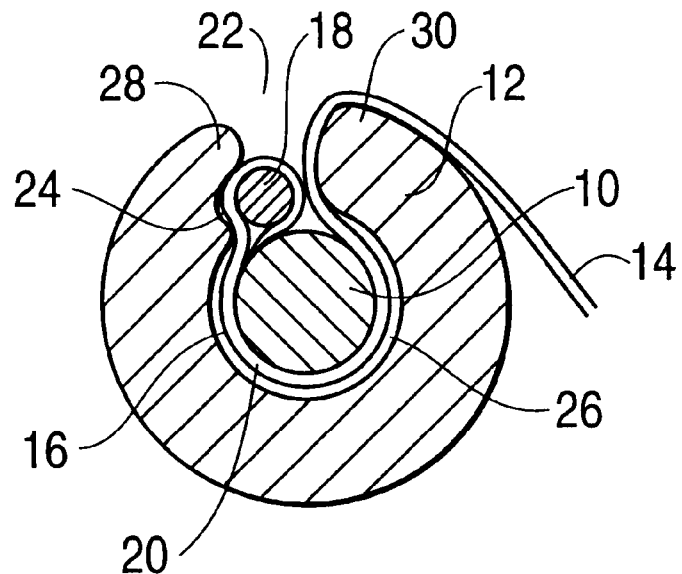
FIG. 1 a section through an embodiment of a belt attachment.

The arrangement shown in FIG. 1 for the attachment of the belt 14 to a reel 12 of the safety belt reeling mechanism has a shaft 10 which is coaxially received in the reel 12. The belt 14 is secured to the reel 12 and its end forms a closed loop 16. For this purpose the belt end is turned back onto itself and sewn with a seam 20.

In the embodiment shown in FIG. 1 an axially extending cut-out 22 is provided in the reel 12 and has a concave section 24 in which the securing pin 18 is received. The belt 14 is introduced into the interior of the reel 12 through the cut-out 22 which is open towards the outer periphery and surrounds the shaft 10 almost completely. After passing around the shaft 10, the loop 16 of the belt 14 enters into the cut-out 22 and thus enables the securing pin 18 to be pushed into the interior of the loop there.

The belt 14, i.e. the loop 16, is received in the ring-like intermediate space between the shaft 10 and the inner periphery of the reel 12 with some clearance which facilitates the installation. As the edge sections 28, 30 of the reel, which face in the direction of the cut-out 22, are rounded off, a gentle guidance of the belt is ensured. For the assembly of the arrangement shown in FIG. 1, the belt provided with the loop 16 is turned over on itself once and the (temporary) loop which thereby arises is pushed onto the shaft 10. After the securing pin 18 has been inserted into the loop 16 the belt 14 can be tightened, whereby the securing pin 18, which is surrounded by the loop 16, is drawn into the cut-out 20 and contacts the concave section 24. The width of the cut-out 22 is dimensioned as that the securing pin 18 can be drawn into the cut-out 22 during this procedure as a result of the elasticity of the belt in the direction of its thickness but no longer leaves the latter without the action of an external force.

Figure 2:
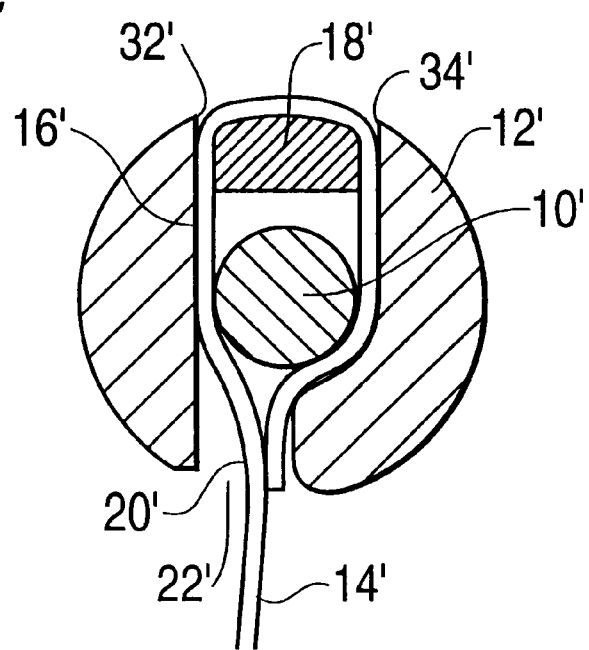
FIG. 2 a section through a second embodiment of the belt attachment.

FIG. 2 shows a second embodiment of the invention in which a shaft 10' is received coaxially within a reel 12'. A belt 14' is also provided here which forms a loop 16' via a seam 20'.

In this embodiment a securing pin 18' is formed in one piece with the reel such that the outer periphery of the reel 12' is provided with two parallel slots 32', 34'. A cut-out 22' is provided in the outer periphery of the reel 10' displaced through substantially 180° relative to the securing pin 18' and the belt 14' is introduced through the cut-out 22' into the interior of the reel.

In the embodiment shown in FIG. 2, the volume of the loop is made larger than in the embodiment of FIG. 1, so that it is possible to push the loop 16' of the belt 14' both onto the shaft 10' and also onto the securing pin 18' connected in one piece to the reel 12'. Thus, in this embodiment, the seam 20' of the belt is no longer located in an intermediate space between the reel and the shaft, but rather in the region of the cut-out 22'. The belt thereby extends from the cut-out 22' through an intermediate space formed between the shaft 10' and the interior of the reel 12', passes out through the slot 32', surrounds the securing pin 18' over a region of approximately 180° and is subsequently guided through the slot 34' back into the interior of the reel 12' entering via a further intermediate space between the shaft 10' and the reel 12' into the cut-out 22' again. At this point the end of the belt is provided with the seam 20'.

In this embodiment the belt is also always located with some clearance between the shaft 10' and the interior of the reel 12'.

As can be seen from FIGS. 1 and 2, the securing pin 18 of the first embodiment has a cross-sectional area which amounts to approximately 25% of the cross-sectional area of the shaft 10. In contrast the cross-sectional area of the securing pin 18' in the embodiment shown in FIG. 2 has substantially the same order of magnitude as the cross-sectional area of the shaft 10'. In both embodiments the shaft turns together with the reel. In just the same way the loop is formed as a closed loop in both embodiments, i.e. the end of the belt is turned over and sewn or secured in another manner.

Reference Numeral List

10, 10' shaft
12, 12' reel
14, 14' belt
16, 16' loop
18, 18' securing pin
20, 20' seam
22, 22' cut-out
24 concave section
26 ring space
28, 30 edge section
32',34' slot

What is claimed is:

1. An arrangement for attaching a belt to a reel of a safety belt reeling mechanism, comprising:

a shaft;

a reel arranged coaxially to the shaft;

a belt attached to the reel and forming a closed loop at its end, and a securing pin extending transverse to the direction of the belt, wherein the securing pin is located in the loop and is not formed by the shaft, and wherein the shaft is located within the loop.

2. An arrangement in accordance with claim 1, wherein the securing pin is unitarily connected to the reel.

3. An arrangement in accordance with claim 1, wherein the securing pin is formed by two spaced apart slots in the reel.

4. An arrangement in accordance with claim 1, wherein an outlet slot for the belt is provided in the reel and is arranged displaced through about 180° relative to the securing pin.

5. An arrangement in accordance with claim 1, wherein the securing pin is arranged in a region of an outlet slot for the belt.

6. An arrangement in accordance with claim 1, wherein the belt and the loop of the belt are arranged at least partly with a clearance between the shaft and the reel.

7. An arrangement in accordance with claim 1, wherein the belt is arranged at least partly with a clearance between the shaft and the reel.

8. An arrangement in accordance with claim 1, wherein the belt loop is arranged at least partly with a clearance between the shaft and the reel.

* * * * *

UNITED STATES PATENT AND TRADEMARK OFFICE
CERTIFICATE OF CORRECTION

PATENT NO.   : 6,059,223
DATED        : May 9, 2000
INVENTOR(S)  : Christophe Koppel et al.

It is certified that error appears in the above-identified patent and that said Letters Patent is hereby corrected as shown below:

Column 2,
Line 31, "TA" should read -- $T_A$ --; and

Column 4,
Line 36, "orbs;" should read -- orbit; --.

Signed and Sealed this

Fifth Day of March, 2002

Attest:

JAMES E. ROGAN
Attesting Officer     Director of the United States Patent and Trademark Office

UNITED STATES PATENT AND TRADEMARK OFFICE
CERTIFICATE OF CORRECTION

PATENT NO. : 6,059,223  
DATED : May 9, 2000  
INVENTOR(S) : Thomas Kempfle et al.

Page 1 of 1

It is certified that error appears in the above-identified patent and that said Letters Patent is hereby corrected as shown below:

This certificate supersedes Certificate of Correction issued March 5, 2002, the number was erroneously mentioned and should be deleted since no Certificate of Correction was granted.

Signed and Sealed this

Ninth Day of April, 2002

*Attest:*

*Attesting Officer*

JAMES E. ROGAN  
*Director of the United States Patent and Trademark Office*